United States Patent [19]

Morita et al.

[11] 4,079,943
[45] Mar. 21, 1978

[54] PICKUP ARM DEVICE DYNAMICALLY DAMPED

[75] Inventors: Katsuhiko Morita, Kyoto; Hiroshi Yasuda, Moriguchi; both of Japan

[73] Assignee: Matsushita Electric Industrial Co., Ltd., Osaka, Japan

[21] Appl. No.: 750,596

[22] Filed: Dec. 15, 1976

[30] Foreign Application Priority Data

Dec. 19, 1975 Japan .............................. 50-152563
Jul. 28, 1976 Japan .......................... 51-101538[U]
Jul. 28, 1976 Japan .......................... 51-101539[U]

[51] Int. Cl.² .......................... G11B 3/16; G11B 3/18
[52] U.S. Cl. ................................................ 274/23 R
[58] Field of Search ..................................... 274/23 R

[56] References Cited

U.S. PATENT DOCUMENTS 3,156,472  11/1964  Brock ................................ 274/23 R
3,623,734  11/1971  Sakamoto .......................... 274/23 R
3,836,155   9/1974  Joannou ............................. 274/23 R
3,926,440  12/1975  Wren ................................. 274/23 R

FOREIGN PATENT DOCUMENTS 2,337,431   2/1975  Germany ........................... 274/23 R Primary Examiner—Charles E. Phillips
Attorney, Agent, or Firm—Burgess, Ryan and Wayne

[57] ABSTRACT

A phonograph pickup arm device wherein one end of a balance weight is connected to one end of an arm through a spring, and a first magnet is supported at the other end of the weight and is immersed in a viscous oil. A second magnet is disposed for displacement toward or away from the first magnet for adjusting the magnetic force acting therebetween so that the compliance of the device which is related to the arm resonance frequency, may be changed and consequently the arm resonance amplitude may be substantially reduced.

8 Claims, 16 Drawing Figures

U.S. Patent   March 21, 1978   Sheet 1 of 6   4,079,943
PRIOR ART   FIG. 1
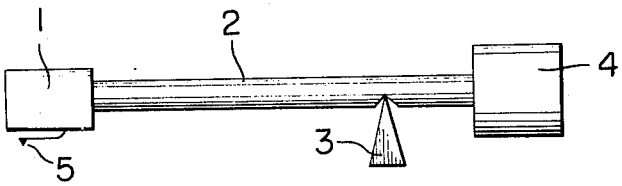
PRIOR ART   FIG. 2
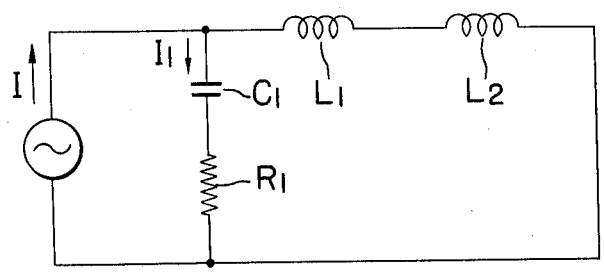
PRIOR ART   FIG. 3
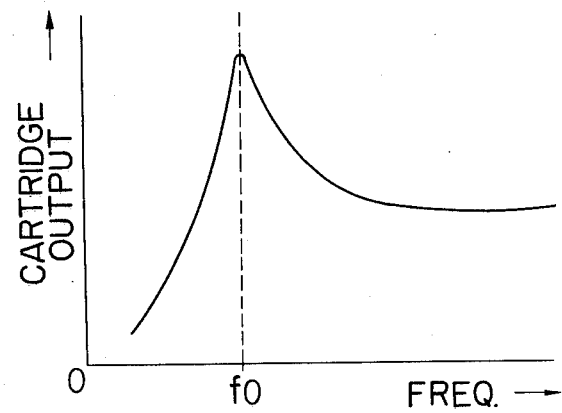
PRIOR ART   FIG. 4
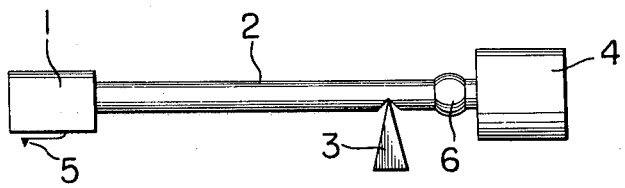

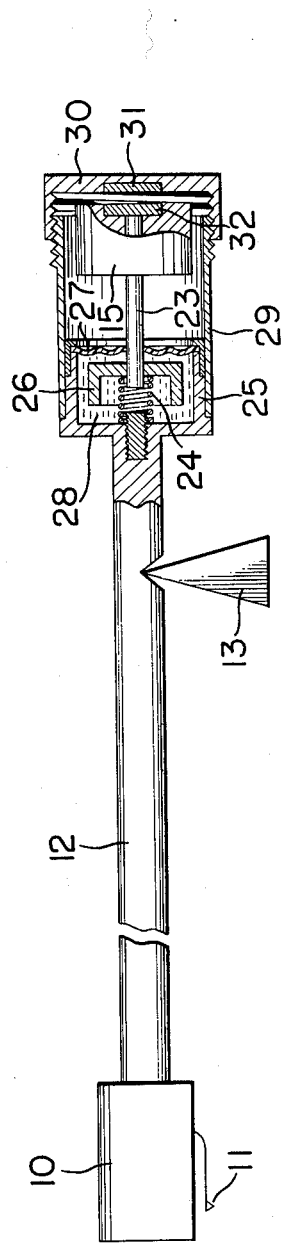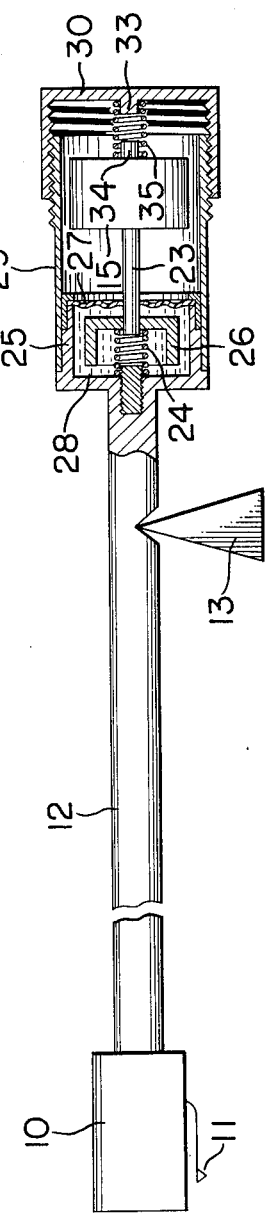

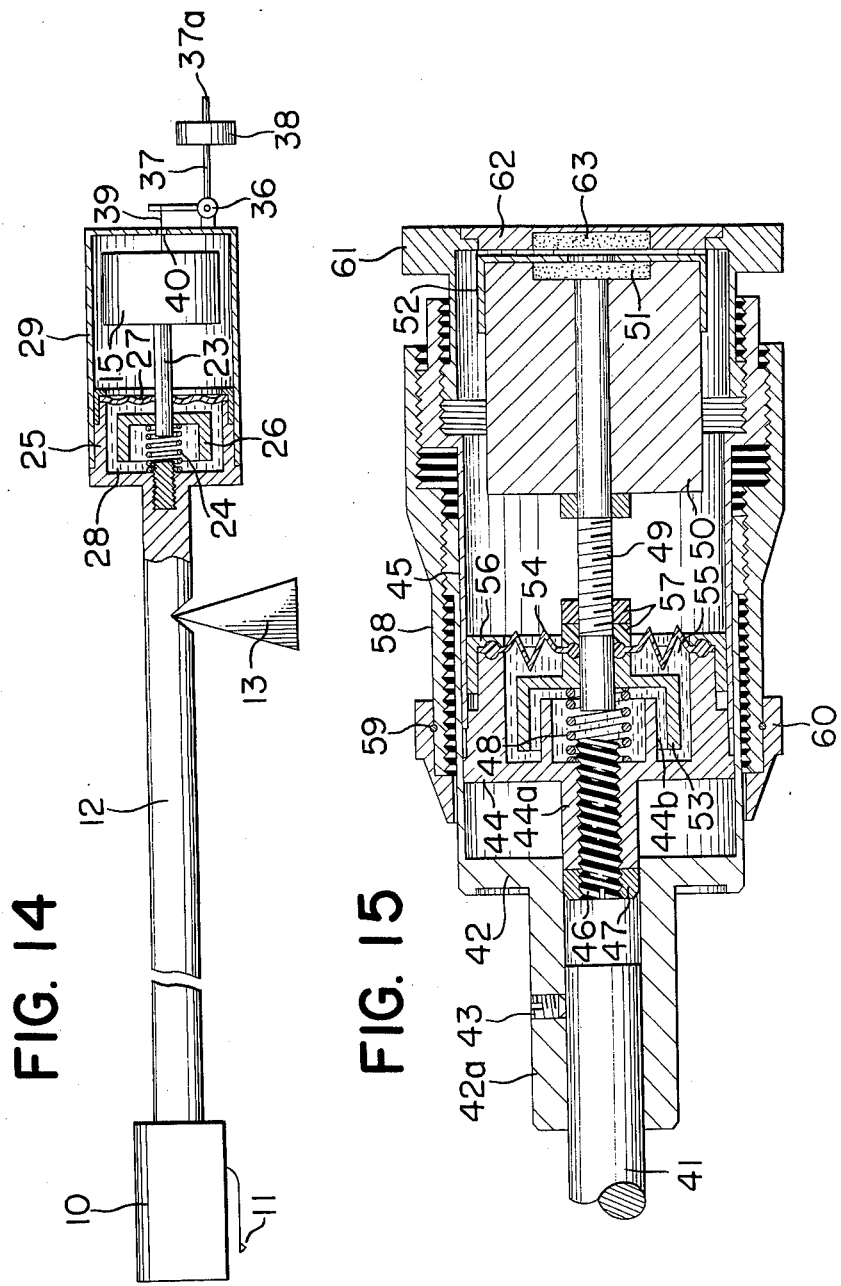

PICKUP ARM DEVICE DYNAMICALLY DAMPED

BACKGROUND OF THE INVENTION

The present invention relates to an improved pickup arm for phonogrph record players.

In general, a pickup arm device consists of an arm pivotably supported on a bearing, a pickup cartridge supported at one end of the arm for tracing the grooves of a disk and converting mechanical vibrations into electrical signals, and a balance weight supported at the other end of the arm for balancing it. The pickup arm device of the type described exhibits a sharp peak at a resonance frequency of the pickup arm or so-called arm-resonance frequency at low frequencies of a frequency characteristic curve so that a vertical motion with a greater amplitude of the cartridge caused by a bent disk results, exerting undesired excessive forces on a reproducer stylus. As a consequence, intermodulation distortion occurs and in the worst case stylus skating occurs.

So far various pickup arm devices have been devised and demonstrated for suppressing the arm resonance. In one device, an arm and a balance weight are coupled to each other through a resilient coupler such as a rubber member or spring. This device exhibits two resonance peaks or shoulders adjacent to the arm resonance frequency, and they are lowered due to a valley or dip of antiresonance between them. With this device, however, the replacement of a cartridge results the displacement of the two resonance peaks so that they cannot be sufficiently lowered and consequently the above-mentioned problems result.

SUMMARY OF THE INVENTION

In view of the above, the present invention is directed to a pickup arm device wherein even in such case of the replacement of a cartridge which results in the change in mechanical vibrating system of the arm, the readjustment of arm resonance suppression may be immediately attained.

The present invention provides a pickup arm device wherein an arm and a balance weight are interconnected to each other through a rubber or spring coupler which may be adjusted to change its compliance.

The present invention also provides a pickup arm device wherein even in case of the replacement of a cartridge the compliance of the coupler may be adjusted whereby the satisfactory resonance suppression may be attained.

A further object of the present invention is to provide a pickup arm device wherein the arm resonance suppression may be relatively freely and simply controlled.

To the above and other ends, briefly stated the present invention provides a pickup arm device an improvement of which comprises a resilient member for interconnecting between one end of an arm and one end of a balance weight, damping means for damping said balance weight, biasing means for biasing said balance weight in the axial direction thereof, and adjusting means for adjusting the biasing exerted from said biasing means to said balance weight, thereby adjusting a compliance of said resilient member.

The above and other objects, advantages and features of the present invention will become apparent from the following description thereof taken in conjunction with the accompanying drawings.

BRIEF DESCRIPTION OF THE DRAWINGS

FIG. 1 is a schematic side view of one example of the prior art pickup arm devices;

FIG. 2 is a circuit diagram of an electrical system equivalent of a mechanical vibrating system thereof;

FIG. 3 shows a frequency characteristic curve at low frequencies thereof;

FIG. 4 is a schematic side view of another example of the prior art pickup arm devices;

FIGS. 12, 13 and 14 are side views, partly in section, of modifications, respectively, of the first embodiment shown in FIG. 8;

FIG. 15 is a fragmentary sectional view, on enlarged scale, of a modification of the pickup arm device shown in FIG. 12 and further including stylus pressure adjusting means.

Same reference numerals are used to designate similar parts throughout the figures.

DESCRIPTION OF THE PREFERRED EMBODIMENTS

Prior Art, FIGS. 1 through 7

Figure 5:
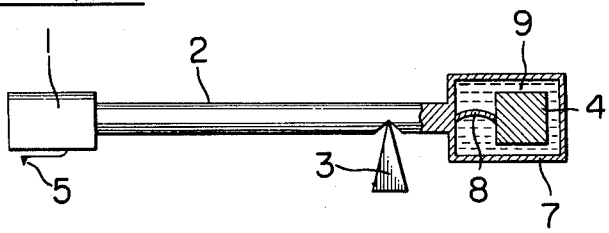
FIG. 5 is a schematic side view of a pickup arm device which the same inventors have invented and which exhibits considerable arm resonance damping effect.

Prior to the description of the preferred embodiments of the present invention, the prior art pickup arm devices will be described for specifically and distinctly pointing out the problems thereof for the better understanding of the present invention.

In FIG. 1 there is shown schematically a prior art pickup arm device comprising an arm 2 supporting at one end a pickup cartridge 1 with a reproducer stylus 5 and at its the other end a balance weight 4, the pickup arm 2 being pivotably supported on a knife-edge bearing 3.

The mechanical vibration system of the pickup arm device of the type wherein the pickup cartridge 1 and the balance weight 4 are directly mounted on the arm 2, may be represented by an electrical system as shown in FIG. 2. In this system, an inductance $L_1$ is equivalent to a effective mass of the pickup cartride 1 (including a head shell) and arm 2 viewed from the tip of the stylus 5; a capacitance $C_1$ and a mechanical resistance $R_1$ are respectively, equivalent to a compliance and a resistance of a support of an armature; an inductance $L_2$ is equivalent to a effective mass of the balance weight 4 viewed from the tip of the reproducer stylus 5; I represents a velocity amplitude of the vibration of the stylus 5 caused by the modulations of record grooves of a disk; and $I_1$ represents a velocity amplitude of the movement of the armature. From this electrical equivalent system it is seen that the pickup arm device has a resonant frequency at low frequencies as shown in FIG. 3 illustrating a low-frequency characteristic curve. That is, the pickup arm device exhibits a sharp resonance peak at a low-frequency resonance frequency or so-called arm resonance frequency $f_o$.

Because of this sharp resonance at low-frequencies, there arises the problem that a bent disk causes excessive vertical movement of the cartridge 1 during playback so that undesired forces are applied to the reproducer stylus 5. As a result, distortions of reproduced signal result, and in the worst case, stylus skating occurs; that is, the stylus 5 is pinched out of the groove and radially moved across the face of the disk.

Figure 6:
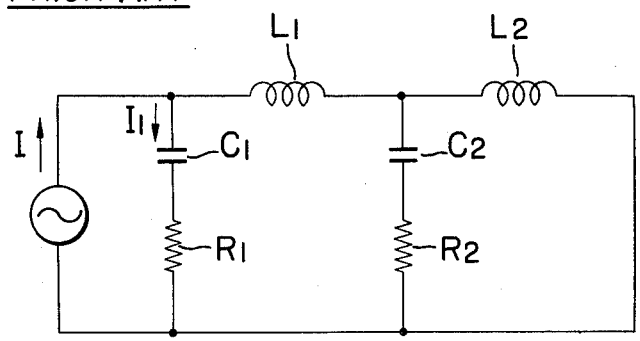
FIG. 6 is a circuit diagram of an electrical system equivalent to a mechanical vibrating system thereof.

In order to overcome these problems there has been devised and demonstrated another prior art pickup arm device of the type wherein, as shown in FIG. 4, a rubber coupler 6 is used for interconnection of the balance weight 4 and the other end of the arm 2 so that a maximum amplitude of vibrations at the resonance frequency of the pickup arm device may be minimized. As with the pickup arm device of the type shown in FIG. 1, the mechanical system of the device shown in FIG. 4 may be represented by an electrical equivalent system as shown in FIG. 6, wherein a capacitance $C_2$ and a resistance $R_2$ are respectively, equivalent to a compliance and a resistance of the coupler 6 viewed from the stylus 5. From the electrical equivalent system it is seen that the pickup arm device with the rubber coupler 6 exhibits two resonance peaks adjacent to an arm resonance frequency. Because of the effect of the valley or dip of antiresonance between the two resonance peaks, a peak level at the arm resonance frequency may be considerably lowered theoretically, but in practice such desirable effect cannot be attained at all. Particularly when the coupler 6 is made of a hard rubber, the capacitance $C_2$ becomes smaller than the suitable level so that as with the pickup arm device without a coupler, a sharp peak appears as shown in FIG. 3.

In order to overcome the above and other problems encountered in the prior art pickup arm devices, the inventors devised and demonstrated a pickup arm device which may considerably lower a peak level at the arm resonance frequency as will be described below with reference to FIG. 5. Within a hollow casing 7 supported at the other end of the arm 2 and filled with a viscous oil 9 the weight 4 is elastically suspended with a spring 8 which is a coupler so that the movement or vibration of the weight 4 may be retarded or damped by a viscous resistance of the viscous oil 9. An electrical equivalent system of this pickup arm device is same with that of the pickup arm device shown in FIG. 4 and is shown in FIG. 6, but $C_2$ is equivalent to a compliance provided by the spring 8 and $R_2$, to a resistance encountered from the viscous oil 9. Therefore, as compared with the pickup arm device with the coupler 6 shown in FIG. 4, $C_2$ and $R_2$ may have sufficiently high values.

Figure 7:
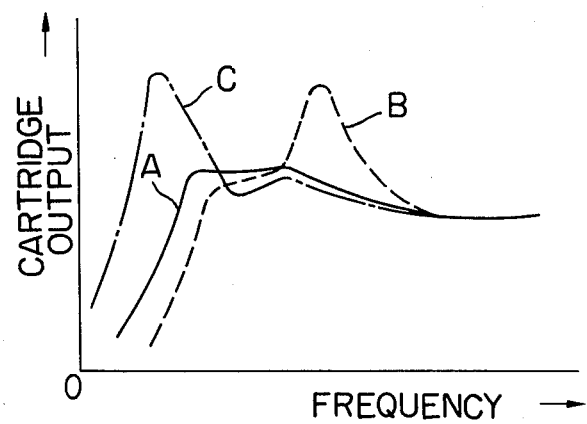
FIG. 7 shows resonance curves at low frequencies used for the explanation thereof.

The pickup arm device shown in FIG. 5 also has two resonance points so that because of the effect exhibited by a valley or dip of antiresonance between the resonance points, peak levels may be lowered. In addition, the viscous oil 9 provides regarding force so that as shown in FIG. 7 a characteristic curve (indicated by the solid line A) is substantially flattened and consequently the peak levels may be considerably reduced. Thus the problems of the distortions of reproduced signals and skating due to the presence of a sharp resonance peak may be substantially overcomed.

In the pickup arm device of the type described, the most effective damping may be attained when the device resonant frequency, which is dependent upon the weight 4 and leaf sprin 8, is selected equal to or slightly lower than the arm resonance frequency $f_o$, but when the mass and compliance of the cartridge 1 change, the resonance peak level becomes higher so that it is difficult to always attain a maximum effect. This will be described in more detail with reference to a resonance curve shown in FIG. 7. When the cartridge 1 is replaced with a cartridge with a lesser mass or compliance after the most desirable resonance curve A has been obtained, then a resonance curve B indicated by broken lines is obtained. On the other hand when the cartridge 1 is replaced with a cartridge with a greater mass or compliance, a resonance curve C indicated by one-dot chain line is obtained. Thus it is seen that the replacement of the cartridge results in a sharp resonance.

The present invention therefore was made to overcome the above problem encountered in the prior art pickup art device and will become more apparent from the following description of preferred embodiments thereof taken in conjunction with FIGS. 8 through 16.

The Invention, FIGS. 8 through 16

Figure 8:
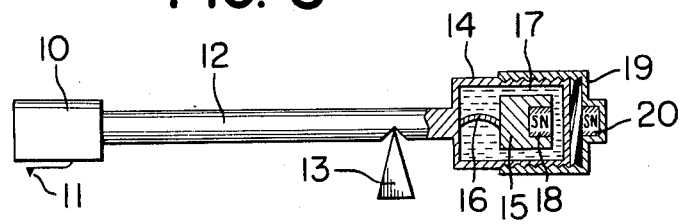
FIGS. 8 and 9 are schematic side views of a first and a second embodiments, respectively, of the present invention.

In FIG. 8 there is shown a preferred embodiment of the present invention comprising an arm 12 which is supported pivotably on a bearing 13 and supports at its one end a cartridge 10 with a reproducer stylus 11 and at its the other end a balance weight assembly. The assembly consists of a hollow casing 14 which is made of a non-magnetic material and attached to the other end of the arm 12, a balance weight 15 supported elastically by a leaf spring 16 within the casing 14, a viscous oil 17 within the casing 14 for damping the motion of the weight and spring 15 and 16, a first magnet 18 embedded in the rear surface of the weight 15, a cup-shaped, internally threaded slider 19 threadably fitted for axial movement over an externally threaded rear portion of the casing 14 and a second magnet 20 disposed in a recess formed in the bottom of the slider 19 in opposed relation with the first magnet. The first and second magnets 18 and 20 are so arranged that the opposite poles are in opposed relation to attract each other. It should be noted that if the weight 15 is made of a magnetic material, the first magnet 18 may be eliminated.

Figure 9:
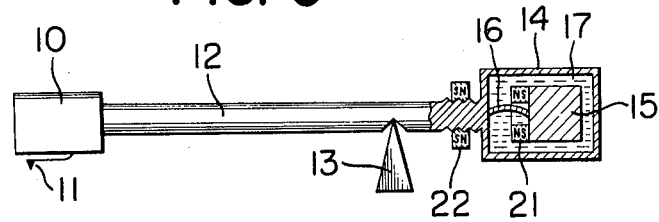

In FIG. 9, there is shown another embodiment of the present invention which is substantially similar in construction to the first embodiment shown in FIG. 8 except that a ring-shaped, first magnet 21 is mounted on the front surface of the weight 15 coaxially of the arm 12 and a ring-shaped second magnet 22 screwed over the arm 12 adjacent to the other end thereof for axial movement toward or away from the casing 14. Opposed to the first embodiment, the first and second magnets 21 and 22 are so arranged that the same poles face each other, whereby they repel each other.

Figure 10:
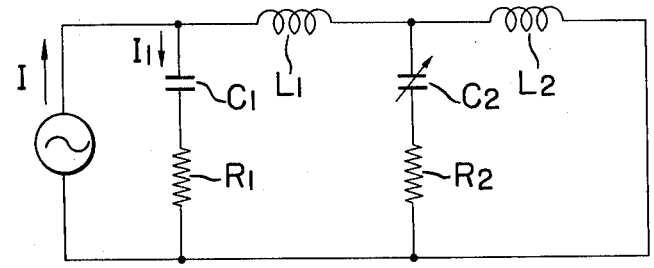
FIG. 10 is a circuit diagram of an electrical system equivalent to a mechanical vibrating system thereof.

Both the first and second embodiments may be represented by an electrical equivalent system shown in FIG. 10, wherein an inductance $L_1$ is equivalent to an effective mass of the cartridge 10 (including a head shell) and arm 12 viewed from the reproducer stylus 11, a capacitance $C_1$ and a resistance $R_1$ are respectively equivalent to an equivalent compliance and a resistance of a support of an armature, an inductance $L_2$ is equivalent to an effective mass of the weight 15 viewed from the stylus, $C_2$ is equivalent to an equivalent compliance provided at the stylus 11 by the spring 16 and the first and second magnets 18 and 20 or 21 and 22, and $R_2$ is equivalent to a resistance or damping factor which the stylus 11 encounters from the viscous oil 17.

In the electrical equivalent system shown in FIG. 10, $C_2$ is shown as a variable capacitor because the equivalent compliance provided by the spring 16 and the first and second magnets 18 and 20 (or 21 and 22) is by far greater than a compliance provided by a rubber coupler and because the equivalent compliance may be varied by the adjustment of a distance between the first and second magnets 18 and 20 (or 21 and 22). This means that a sharp resonance resulting from the replacement of the cartridge may be eliminated by the adjustment of $C_2$.

More specifically, if the compliance $C_1$ is lowered by the replacement of the cartridge 10, the compliance $C_2$ may be lowered by a decrease in distance between the first and second magnets 18 and 20 (or 21 and 22). On the other hand, when the compliance $C_1$ of the cartridge 10 is increased, the distance between the first and second magnets 18 and 20 (or 21 and 22) may be increased, thereby increasing the compliance $C_2$ accordingly.

Figure 11:
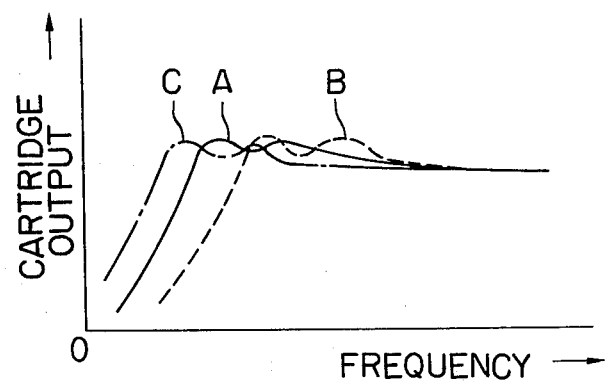
FIG. 11 shows resonance curves used for the explanation thereof.

Resonance curves of the first or second embodiment are shown in FIG. 11. A solid-line resonance curve A indicates resonance when a standard cartridge is used; a broken-line resonance curve B, when a cartridge with a lesser mass or lower compliance is attached; and a chain-line resonance curve C, when a cartridge with a heavier mass or greater compliance is mounted.

As described above, the pickup arm devices in accordance with the present invention have a low resonance peak level so that they exhibit excellent traceability even on a bent disk and consequently intermodulation distortion may be substantially eliminated. Thus excellent reproduction may be assured.

In the first and second embodiments, the spring 16 which functions as a coupler, may be made of an elastic material such as soft rubber or viscous material and instead of the viscous oil 17 for retarding or damping the movement of the weight 15, any suitable liquids having suitable viscosity such as water may be used. Alternatively, retarding or damping action may be provided by a suitable control of flow of air in the casing 14 or may be provided by the elasticity of rubber.

The first and second embodiment are only schematically illustrated in FIGS. 8 and 9 for the sake of explanation of the underlying principle of the present invention. Therefore they will be described in detail below with reference to FIGS. 12, 13 and 14 which show in more detail the preferred embodiments of the present invention.

Referring to FIG. 12, a pickup arm device comprises the arm 12 which is pivotably supported by the bearing 13 and supports at one end the cartridge 10 with the reproducer stylus 11 and at the other end a balance weight assembly. More specifically, the other end of the arm 12 is terminated to a cup-shaped oil pot or cylinder 25 including a cup-shaped piston 26 and oil 28 sealed with a sealing member 27. Within a cylindrical balance weight casing 29 which is securely fitted over the oil pot or cylinder 25, the balance weight 15 is disposed which has a stem 23 extended coaxially of the weight 15 and through the sealing member 27 and the piston 26 and securely attached thereto. The free end of the stem 23 is resiliently connected to the other end of the arm 12 or the bottom of the oil cylinder 25 through a coiled spring 24 which may be replaced with any suitable elastic manner such as a leaf spring or rubber. The sealing member 27 tightly seals the stem 23 to prevent the leakage of oil into the weight casing 29. A first magnet 32 is embedded in an end face of the weight 15 opposite to the stem 23, whereas a second magnet 31 is embedded in opposed relation with the first magnet 32 in an adjusting knob or axially movable means 30 screwed on the weight casing 29 for axial movement of the second magnet 31 toward or away from the first magnet 32. As with the case of the embodiment shown in FIG. 8, the opposite poles of the first and second magnets 32 and 31 face each other to attract each other.

The mode of operation is substantially similar to that of the first embodiment shown in FIG. 8 so that no description shall be made, but the pickup arm device shown in FIG. 12 has a very unique feature to be described below.

Referring back to FIG. 10, in general, the greater a division ratio defined as $\mu = L_2/L_1$, the higher the arm resonance suppression effect becomes. For a greater $\mu$, $L_1$ may be decreased while $L_2$ may be increased, but there is a limit to the decrease in $L_1$ and the increase in $L_2$ results in adverse effects on $L_1$. Thus it is difficult to attain a high division ratio in the prior art pickup arm devices.

In the pickup arm device shown in FIG. 12, however, $L_2$ may be increased freely by changing the length of the stem 23 so that a high $\mu$ may be obtained. Because when the length of the stem 23 is made a multiple of $k$, the mass of the required balance weight 15 is proportional to $1/k$, and since the effective mass is in proportion to the square of the distance of the stem 23 and thus becomes a multiple of $k$ by $k^2 \times 1/k$, $L_2$ may be increased and a high $\mu$ may be obtained. In addition, the viscous damping arrangement consisting of the oil cylinder 25, piston 26, viscous oil 28 and sealing member 27 may be located closer to the bearing 13 so that its equivalent mass may be considerably decreased because an equivalent mass is in proportion to the square of the distance of the stem 23.

As shown in FIGS. 8 and 9, the arm resonance suppression effect in the pickup arm device using a leaf spring as a coupler is obtained when the stylus 11 vibrates up and down, but a good effect cannot be obtained when the stylus 11 vibrates horizontally, because the leaf spring 16, although it has a big compliance for up and down vibration, has almost none of compliance for horizontal vibration and in this case, becomes equivalent to the arm device shown in FIG. 1, whereto the arm body 12 and the weight 15 are directly connected. As the matter of fact, while playing a record, the stylus vibrates at random and therefore it is difficult for the arm device shown in FIGS. 8 and 9 to obtain the best effect regardless of how the whole device is arranged. This problem may well be applied to howling trouble, too. When any outside up and down vibration of the bearing 13 supporting the arm body 12 be applied to the arm body 12 itself, although little attack be seen on the output of the cartridge, any horizontal outside vibration be applied to the arm body 12, it becomes a cause to generate howling through an influence over the output of the cartridge. However, the pickup device in FIG. 12 uses the coil spring 24, which enables it to suppress every random vibration of the stylus in its arm-resonance and also prevent howling from generating.

A pickup arm device shown in FIG. 13 is substantially similar in construction to the device shown in FIG. 12 except that means for changing a compliance of the spring 24 is different. That is, a coiled spring 35 is loaded between projections or spring retainers 34 and 33 extended from the opposed surfaces, respectively, of the weight 15 and the adjusting knob 30 coaxially thereof and in opposed relation. Therefore when one rotates the adjusting knob 30 to displace it toward or away from the weight 15, a pulling or pushing force exerted to the back face thereof may be suitably adjusted.

The pickup arm devices shown in FIGS. 12 and 13 may be also represented by the equivalent system shown in FIG. 10, where $L_1$ is an equivalent mass of the cartridge 10 (including a head shell) and arm 12 viewed from the reproducer stylus 11; $C_1$ and $R_1$ are respectively equivalent to an equivalent compliance and a resistance of a support of an armature; $L_2$ is equivalent to an equivalent mass of the weight 15 when viewed from the reproducer stylus 11; $C_2$ is an equivalent compliance provided by the springs 24 and 35 when viewed from the stylus 11; $R_2$ is an equivalent resistance provided by the viscous oil 28 (viscous damping) viewed from the stylus 11; I is a velocity amplitude of the stylus on the face of a disk; and $I_1$ is a velocity amplitude of the armature.

$C_2$ which is by far greater than that of the pickup arm device of the type having a rubber coupler, may be suitably adjusted depending upon a cartridge 10 to be used by the displacement of the adjusting knob 30 for changing the compression of the spring 35, thereby changing the compliance of the spring 24, so that an occurance of sharp resonance may be avoided.

More specifically, when the replacement of a cartridge 10 results in decrease in compliance $C_1$, the adjusting knob 30 is displaced backwardly or away from the weight 15 so that the compliance $C_2$ may be decreased. On the other hand, when the replacement results in the increase in compliance $C_1$, the adjusting knob 30 may be displaced forwardly to increase the compliance $C_2$.

A pickup arm device shown in FIG. 14 is also substantially similar in construction to the device shown in FIG. 12 except for means for adjusting the compliance of the spring 24. That is, the adjusting knob 30 is eliminated, and a cup-shaped weight casing 29 with a bottom formed with a center hole 40 is fitted securely over the oil cylinder 25. An L-shaped lever has its bend pivoted with a pin 36 to a lower position on an outer end face of the casing 29 and has an auxiliary weight or slider 38 slidably fitted over one or horizontal arm 37a. The free end of the other or vertical arm 37b of the lever 37 is connected to the center of the outer end face of the weight 41 with a string or five wire 39 extended coaxially of and without any contact with the edge of the center hole 40. Therefore because of the slider 38, the L-shaped lever 37 is normally biased to rotate in the clockwise direction about the pivot pin 36 so that the weight 15 is pulled axially through the string or wire 39. Thus a pulling force exerted to the weight 15 and hence the compliance may be suitably adjusted depending upon a cartridge 10 used by the displacement of the slider 38.

The pickup arm device shown in FIG. 14 may be also represented by the electrical system shown in FIG. 10, where $L_1$ is an equivalent mass of the cartridge 10 (including its head shell) and arm 12 when viewed from the reproducer stylus 11; $L_2$, an equivalent mass of the weight 15 when viewed from the stylus 11; $C_1$ and $R_1$, an equivalent compliance and an equivalent resistance of a support of an armature; $C_2$, an equivalent compliance provided by the spring 24 and slider 38 when viewed from the stylus 11; 52, an equivalent resistance or damping constant provided by the viscous damping when viewed from the stylus 11; I, a velocity amplitude of the stylus 11 on the face of a disk; and $L_1$, a velocity amplitude of the armature.

In this system, $C_2$ which is by far greater than that of the pickup arm devices having a rubber coupler may be suitably adjusted depending upon the cartridge 10 used by the slidable displacement of the slider 38 along the arm 37a for changing the pulling force exerted to the weight 15 and hence the compliance of the spring 24. Therefore an occurrence of sharp resonance resulted from the replacement of a cartridge 10 may be avoided.

More specifically, when the replacement of a cartridge 10 results in a small compliance $C_1$, one may displace the slider 38 away from the weight casing 29 so that the compliance $C_2$ may be decreased accordingly. On the other hand the increase in $C_1$ may be compensated by the displacement of the slider 38 toward the weight casing 29 for increasing the compliance $C_2$.

In the pickup arm devices shown in FIGS. 12, 13 and 14, for the sake of simplicity for the explanation of means for changing the compliance of the spring 24, means for displacing the balance weight 15 for adjusting the stylus pressure has not been shown so that an pickup arm device including every inventive element including means for displacing the weight 15 will be described in detail with reference to FIGS. 15 and 16.

Figure 16:
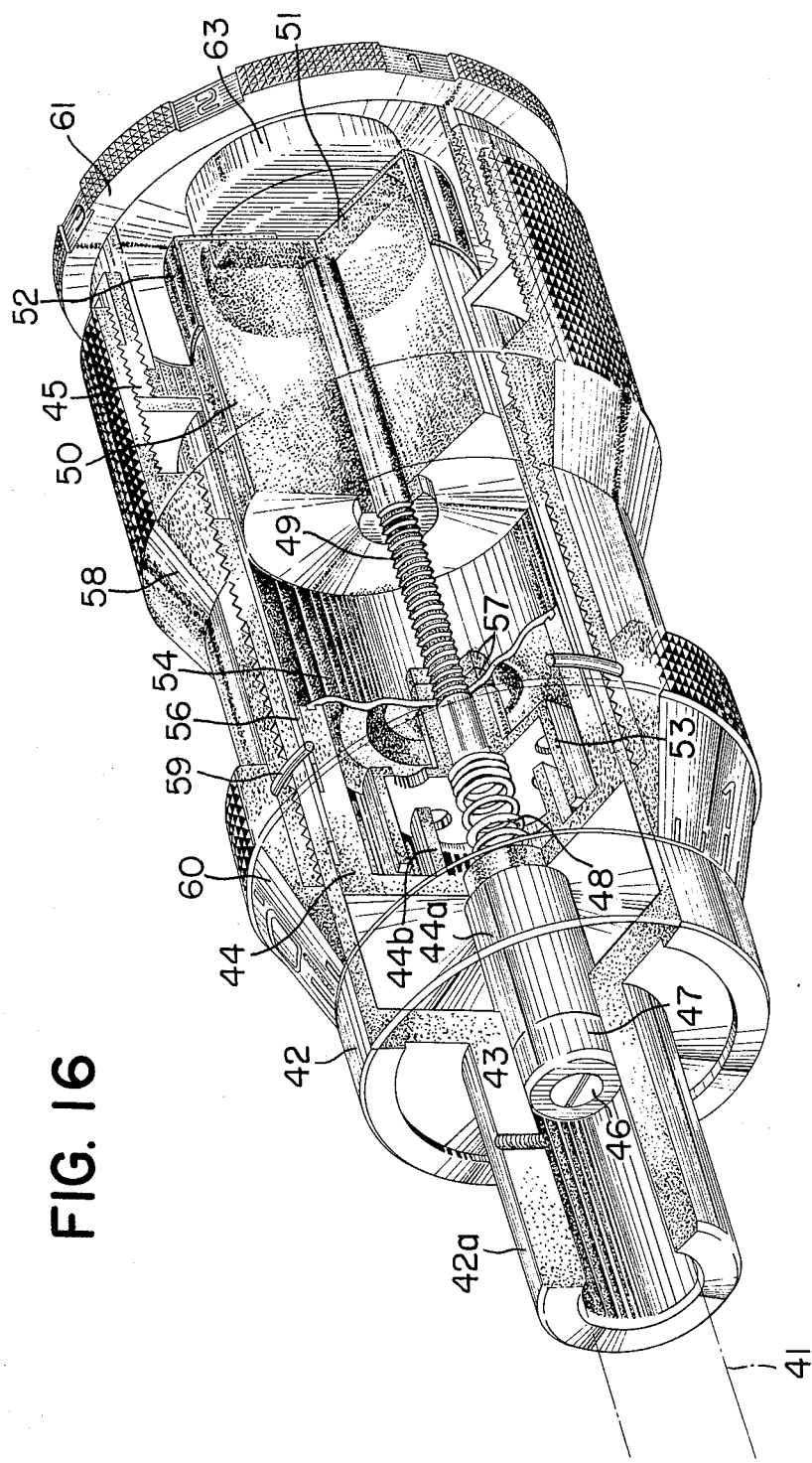
FIG. 16 is a perspective view, partly in section, thereof.

The pickup arm device shown in FIGS. 15 and 16 is substantially similar in construction to the device shown in FIG. 12 except that means for displacing the weight 15 is added.

A balance weight assembly supported at one end of an arm indicated by 41 in this embodiment, comprises a cylindrical casing 42, a viscous damping 44, a coupling sleeve 45, a balance weight 50, a stylus pressure adjusting thimble 58 and a compliance adjusting knob 61 as will be described in detail hereinafter.

The cylindrical casing 42 is cup-shaped in cross section and has a coaxial hollow stem or reduced diameter portion 42a extended inwardly or toward the left in FIG. 15 and formed with a coaxial bore into which one end of the arm 41 is fitted and securely held in position with a setscrew 43. The casing 41 has an externally threaded portion adjacent to the outer or open end thereof for engagement with the stylus pressure adjusting thimble 58 as will be described in more detail hereinafter.

The oil pot or cylinder 44 of the viscous damping is also cup-shaped in cross section and has a stem 44a which is coaxially inwardly extended and is internally threaded, and an inner annular wall 44b which is coaxially outwardly extended and spaced apart from an outer cylinder wall by a suitable distance. A spring retaining screw 46 is screwed into the stem 44b and is securely held in position with a nut 47 screwed to an inner end thereof. The stem 44a with the screw 47 is slidably fitted into the bore of the stem 42a of the casing 42. A cup-shaped piston 53 which is supported at a free or inner end of a weight stem 49 is placed in the cylinder 44 in such a way that an outer wall of the piston 53 is interposed between the outer and inner walls of the cylinder 44, and a coiled spring 48 is loaded between the an outer end of the spring retaining screw 46 and the inner end of the weight stem 49. A viscous oil 55 such as silicon oil is filled into the cylinder 44 and is sealed with a diaphragm-like, flexible sealing member 54 with its outer peripheral rim securely attached on the cylinder wall with a retaining member 56. The weight stem 49 is extended through the sealing member 54 and is liquid-tightly sealed with rubber packings 57 fitted over the stem 49.

The balance weight 50 from which is coaxially extended the stem 49 has a first magnet 51 embedded in an outer end face and securely held in position with a magnet retaining cap 52 made of a rubber sheet and fitted over the balance weight 50. Thus the weight 50 is elastically supported by the spring 48 and the viscous damping.

The coupling or interconnecting sleeve 45 has its outer end terminated into an enlarged-diameter portion which is internally and externally threaded. The coupling sleeve 45 is axially slidably fitted between the casing 42 and the oil cylinder 44 and is so guided by guide means (not shown) that its rotation about its axis may be prevented just like a splined sleeve.

The stylus pressure adjusting thimble 58 is internally threaded and screwed on the casing 42 and the coupling sleeve 45 for rotation. A stylus-pressure dial sleeve 60 is fitted over the thimble 58 with a ring spring 59 interposed therebetween in such a way that when one holds the thimble 58 stationary, one may freely rotate the dial sleeve 60 with respect to the thimble 58, but when one rotates the thimble 58 the dial sleeve 60 may rotate in unison therewith.

The compliance adjusting knob 61 has externally threaded screws in engagement with the internally threaded screws of the coupling sleeve 45 at the outer end thereof for axial movement relative thereto. The adjusting knob 61 has a cap 62 snuggly fitted into an coaxial opening of the knob 61 and a second magnet 63 embedded into the cap 62 in opposed relation with the first magnet 51 of the weight 50. The same poles of the first and second magnets 51 and 63 are opposed so that they repel each other. As shown in FIG. 16, numeral marks are marked on the periphery of the adjusting knob 61 so that one may easily read an adjusted compliance.

Next the mode of operation will be described. First, to adjust the compliance for the suppression of the arm resonance, one may rotate the adjusting knob 61 in either direction to move the second magnet 63 toward or away from the first magnet on the weight 50. Secondary to adjust the stylus pressure, one rotates the thimble 58 in either direction to diplace the weight 50.

In summary, according to the present invention, a balance weight is supported at one end of an arm through a resilient member such as a spring and a viscous damping arrangement so that the arm resonance may be substantially suppressed. Therefore the trackability of the arm may be significantly improved and the skating problem may be eliminated so that the intermodulation distortion problem may be eliminated and consequently excellent playback may be ensured.

What is claimed is:

1. A dynamically damped pickup arm device, comprising:
   a pickup arm,
   a balance weight,
   a resilient member interconnecting one end of said arm and one end of said balance weight,
   damping means for damping said balance weight, said damping means being coupled to said balance weight and support by said pickup arm,
   biasing means coupled between said weight and said arm for applying a biasing force to said balance weight, and
   adjusting means supported on said arm for adjusting the biasing force applied by said biasing means to said balance weight, thereby adjusting the resonance frequency of said balance weight of said resilient member.

2. A dynamically damped pickup arm device as set forth in claim 1 wherein said biasing means comprises:
   a first magnet supported on said balance weight;
   a second magnet disposed adjacent said first magnet, so that a magnetic interactive force is generated by said magnets; and
   said adjusting means includes means for varying the distance between said magnets.

3. A dynamically damped pickup arm device as set forth in claim 1 wherein one of said biasing means and said balance weight includes a magnetic material and the other of said biasing means and balance weight comprises a magnet adjacent said magnetic material; and said adjusting means includes means for varying the distance between said magnetic material and said magnet.

4. A dynamically damped pickup arm device as set forth in claim 1 wherein said biasing means and said adjusting means comprise, in combination, an axially movable member disposed adjacent the other end of said balance weight and a second resilient member coupling said other end of said balance weight to said movable member.

5. A dynamically damped pickup arm device as set forth in claim 1 wherein said biasing means comprises an auxiliary weight supported on said arm for exerting a pulling force on the other end of said balance weight; and
   said adjusting means includes means for moving said auxiliry weight.

6. A dynamically damped pickup arm device as set forth in claim 1 wherein said balance weight, said resilient member, said biasing means, said damping means and said adjusting means are assembled as a unit which in turn is axially movably supported at said one end of said arm, whereby the stylus pressure exerted by said arm may be adjusted.

7. A dynamically damped pickup arm device as set forth in claim 1, wherein said resilient member comprises a coiled spring.

8. A dynamically damped pickup arm device comprising:
   a pickup arm;
   a balance weight having a coaxial stem extending from one end thereof;
   a resilient member interconnecting one end of said pickup arm and the end of said stem remote from said weight;
   viscous damping means disposed between said remote end of said coaxial stem of said balance weight and said one end of said pickup arm, whereby vibration of said balance weight may be damped by said viscous damping means; and
   adjustable means for biasing said resilient member by urging said weight away from said arm.

* * * * *

UNITED STATES PATENT OFFICE
CERTIFICATE OF CORRECTION

Patent No. 4,079,943     Dated March 21, 1978

Inventor(s) Katsuhiko Morita, et al

It is certified that error appears in the above-identified patent and that said Letters Patent are hereby corrected as shown below:

In the Title Page, and at the top of column 1, the title should read --Dynamically Damped Pickup Arm Device--.

Column 1, line 6: "phonogrph" should be --phonograph--.

Column 2, line 57: "cartride" should be --cartridge--.

Column 4, line 4: "sprin" should be --spring--.

Column 5, line 59: "to" should be --in--.

Column 7, line 32: "occurance" should be --occurrence--.

Column 9, line 51: "diplace" should be --displace--.

Column 10, line 41: "auxiliry" should be --auxiliary--.

Signed and Sealed this

Twenty-sixth Day of September 1978

[SEAL]

Attest:

RUTH C. MASON
Attesting Officer

DONALD W. BANNER
Commissioner of Patents and Trademarks